United States Patent
Yamamura et al.

(10) Patent No.: US 8,850,941 B2
(45) Date of Patent: Oct. 7, 2014

(54) CUTTING DEVICES

(75) Inventors: Goh Yamamura, Anjo (JP); Tomohiro Hachisuka, Anjo (JP)

(73) Assignee: Makita Corporation, Anjo-shi (JP)

(*) Notice: Subject to any disclaimer, the term of this patent is extended or adjusted under 35 U.S.C. 154(b) by 519 days.

(21) Appl. No.: 12/585,611

(22) Filed: Sep. 18, 2009

(65) Prior Publication Data
US 2010/0089215 A1 Apr. 15, 2010

(30) Foreign Application Priority Data
Oct. 10, 2008 (JP) ................................ 2008-264052

(51) Int. Cl.
*B26D 5/08* (2006.01)
*B27B 5/29* (2006.01)
*B23D 45/04* (2006.01)

(52) U.S. Cl.
CPC ..................... *B27B 5/29* (2013.01);
*B23D 45/044* (2013.01)
USPC ............. 83/581; 83/471.2; 83/471.3; 30/388; 30/514

(58) Field of Classification Search
USPC ............. 83/581, 471.3, 471.2, 490, 473, 519; 16/430
See application file for complete search history.

(56) References Cited

U.S. PATENT DOCUMENTS

| | | | | |
|---|---|---|---|---|
| 1,490,597 A | * | 4/1924 | Darabos | 83/488 |
| 3,104,687 A | * | 9/1963 | Field | 83/486.1 |
| RE27,565 E | * | 1/1973 | Botefuhr | 83/471.3 |
| 4,184,395 A | * | 1/1980 | Blachly et al. | 83/486.1 |
| 4,428,266 A | * | 1/1984 | Keddie | 83/767 |
| 4,909,114 A | * | 3/1990 | Astle | 83/745 |
| D323,966 S | * | 2/1992 | Tanabe | D8/97 |
| 5,347,902 A | * | 9/1994 | Brickner et al. | 83/468.3 |
| 5,445,479 A | * | 8/1995 | Hillinger | 408/16 |
| 5,969,312 A | * | 10/1999 | Svetlik et al. | 200/61.85 |
| D418,525 S | * | 1/2000 | Watson et al. | D15/133 |
| 6,513,412 B2 | * | 2/2003 | Young | 83/471.3 |
| 6,595,095 B2 | * | 7/2003 | Chen | 83/473 |

(Continued)

FOREIGN PATENT DOCUMENTS

| | | |
|---|---|---|
| DE | 20 2004 004 929 U1 | 7/2004 |
| EP | 1 541 305 A1 | 6/2005 |

(Continued)

OTHER PUBLICATIONS

European Search Report for Application No. 09012027.0, issued Jan. 29, 2010.
Jan. 29, 2013 Office Action issued in Japanese Patent Application No. 2008-264052 (with translation).

* cited by examiner

*Primary Examiner* — Omar Flores Sanchez
(74) *Attorney, Agent, or Firm* — Oliff PLC

(57) ABSTRACT

The present invention includes a cutting device including a table configured to accommodate a workpiece, and a cutting unit positioned on an upper side of the table and being operable to vertically move relative to the table. The cutting unit includes a cutting blade, and a grip portion disposed on a lateral side of the cutting blade and capable of being grasped by an operator in order to vertically move the cutting unit. The grip portion has a palm contact part that can be touched by a palm of the operator when the operator grasps the grip portion. The palm contact part is inclined relative to a reference line that may be perpendicular to a surface of the cutting blade.

18 Claims, 5 Drawing Sheets

(56) References Cited

U.S. PATENT DOCUMENTS

| | | |
|---|---|---|
| 6,753,490 B2 * | 6/2004 | Svetlik et al. ............... 200/321 |
| 7,552,666 B2 * | 6/2009 | Liu et al. ...................... 83/471.3 |
| 2004/0089125 A1 * | 5/2004 | Schoene et al. .............. 83/471.3 |
| 2004/0255748 A1 * | 12/2004 | Dils et al. ........................ 83/581 |
| 2006/0112804 A1 * | 6/2006 | Dils et al. ........................ 83/581 |
| 2007/0074615 A1 | 4/2007 | Lin |
| 2007/0151434 A1 * | 7/2007 | Oberheim ....................... 83/581 |

FOREIGN PATENT DOCUMENTS

| | | |
|---|---|---|
| JP | A-06-126655 | 5/1994 |
| JP | A-09-001478 | 1/1997 |
| JP | A-2001-205602 | 7/2001 |
| JP | A-2002-240001 | 8/2002 |
| JP | A-2007-118383 | 5/2007 |
| WO | WO 2010/052015 A1 | 5/2010 |

CUTTING DEVICES

This application claims priority to Japanese patent application serial number 2008-264052, the contents of which are incorporated herein by reference.

BACKGROUND OF THE INVENTION

1. Field of the Invention

The present invention relates to cutting devices having a table and a cutting unit supported on the table.

2. Description of the Related Art

In general, cutting devices having tables are portable and can be placed on a workbench or a floor. A known cutting device has a table for accommodating a workpiece and a cutting unit vertically pivotally mounted to the table. The cutting unit has a circular cutting blade rotatably driven by a motor. With a workplace placed on the table, the cutting unit is pivoted downward, so that the rotating cutting blade can cut the workpiece.

The cutting unit has a handle that can be held by an operator. In order to cut a workpiece, the operator may be positioned on the front side of the cutting unit and holds the handle with his right or left hand for vertically pivoting the cutting unit.

In general, the handle has a vertical-type grip portion extending in a vertical direction. In recent years, there has been proposed a handle having a horizontal-type grip portion extending horizontally. A handle having such a horizontal-type grip portion is disclosed in Japanese Laid-Open Patent Publication No. 2007-118383.

When a right-handled operator grasps a handle having a horizontal-type grip portion for operating a cutting unit, the operator is normally positioned on the front side of a cutting blade of the cutting unit and on the left side of the cutting blade and extends his or her right hand to the grip portion in a direction toward the right side of the cutting blade. In such a case, it is necessary for the operator to twist his or her right wrist toward the left side for grasping the grip portion. A trigger type-switch lever is normally provided to the handle on the inner side of the grip portion and is operable for starting the motor. For this reason, in order to start the motor, the operator is forced to operate the switch lever with his or her fingers while his or her right wrist being twisted leftward.

Therefore, there is a need in the art for a cutting device having a handle with a horizontal-type grip portion that is improved in operability.

SUMMARY OF THE INVENTION

One aspect according to the present invention includes a cutting device including a table configured to accommodate a workpiece, and a cutting unit positioned on an upper side of the table and being operable to vertically move relative to the table. The cutting unit includes a cutting blade and a grip portion disposed on a lateral side of the cutting blade and capable of being grasped by an operator in order to vertically move the cutting unit. The grip portion has a palm contact part that can be touched by the palm of the operator when the operator grasps the grip portion. The palm contact part is inclined relative to a reference line that may be perpendicular to a surface of the cutting blade.

DETAILED DESCRIPTION OF THE INVENTION

Figure 1:
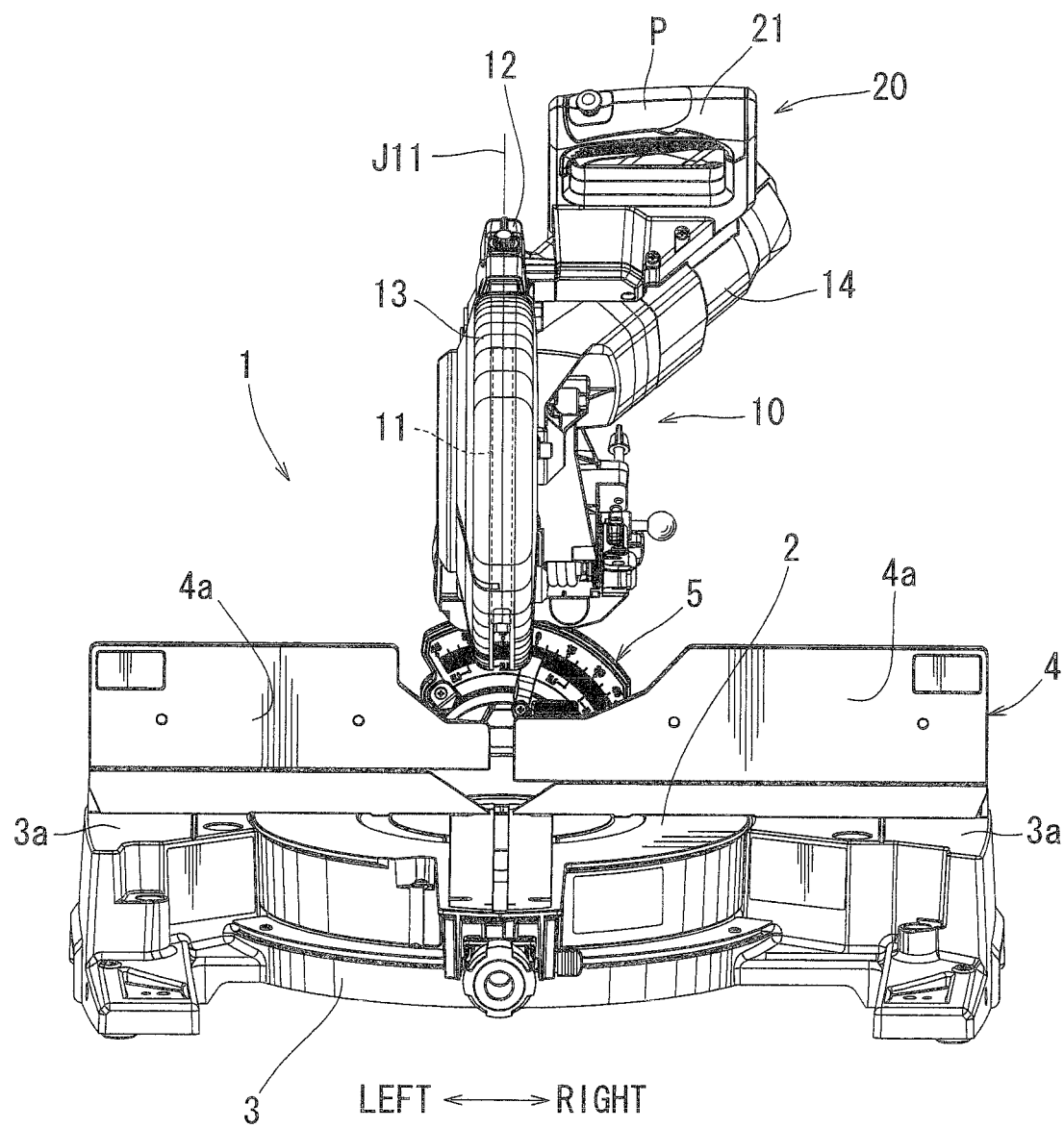
FIG. 1 is a perspective view as view from a front upper side of a cutting device according to an embodiment of the present invention and showing the state where the cutting device is returned to an upward pivoted position.
Figure 2:
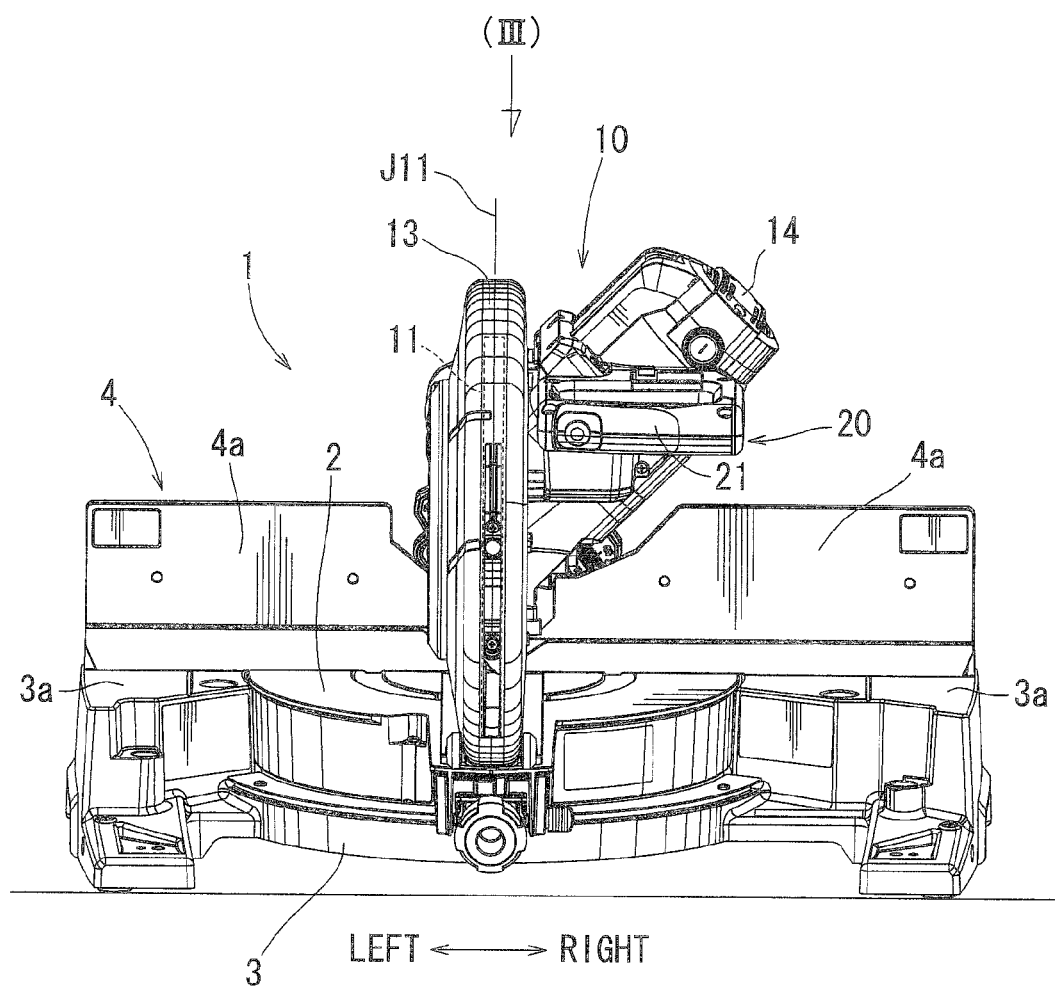
FIG. 2 is a perspective view similar to FIG. 1 but showing the state where the cutting device is pivoted to a downward pivoted position.
Figure 3:
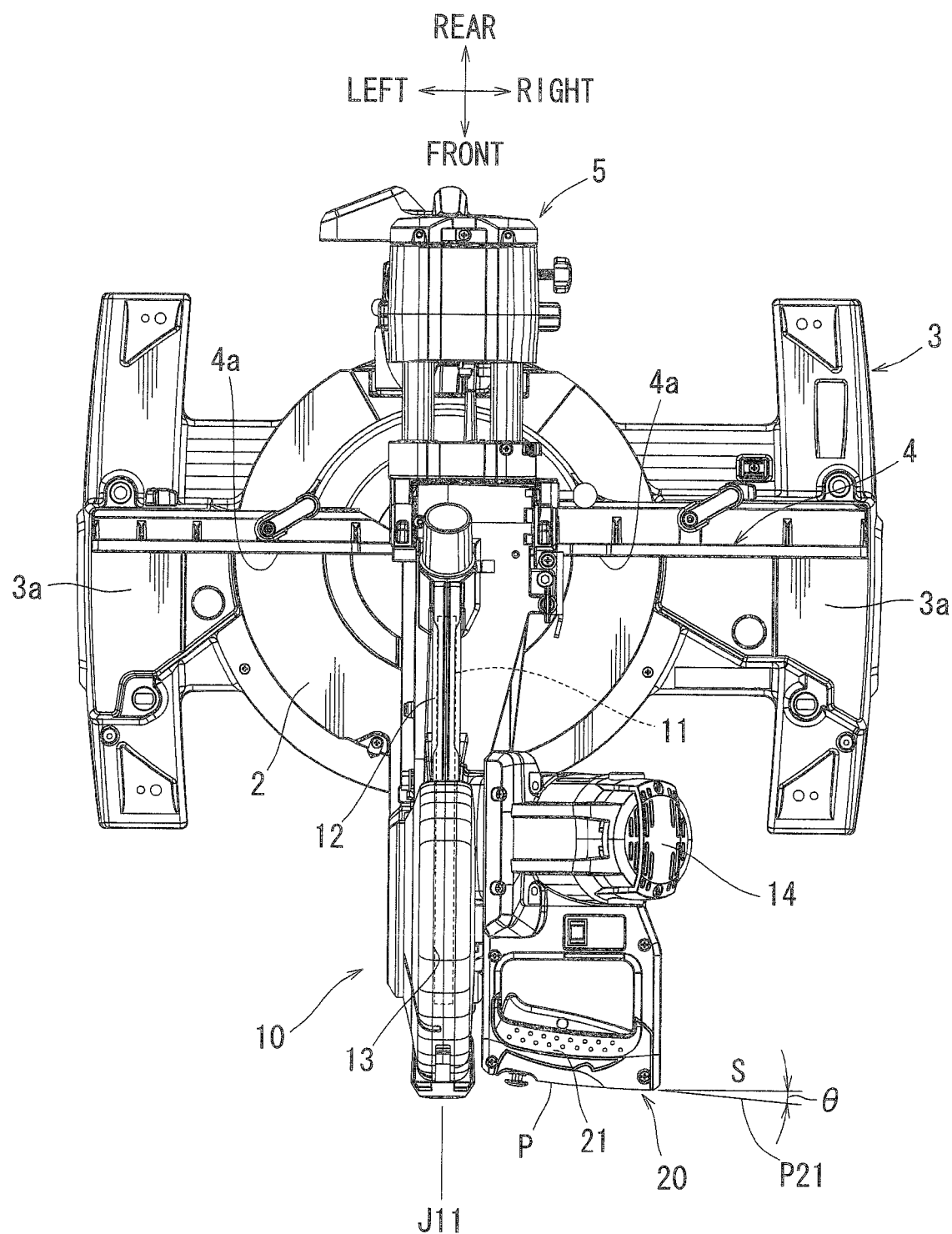
FIG. 3 is a plan view of the cutting device as viewed in a direction of arrow III, in FIG. 2.

Each of the additional features and teachings disclosed above and below may be utilized separately or in conjunction with other features and teachings to provide improved cutting devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a cutting device includes a table configured to accommodate a workpiece, and a cutting unit positioned on an upper side of the table and being operable to vertically move relative to the table. The cutting unit includes a cutting blade and a grip portion disposed on a lateral side of the cutting blade and capable of being grasped by an operator in order to vertically move the cutting unit. The grip portion has a palm contact part that can be touched by the palm of the operator when the operator grasps the grip portion. The palm contact part has a first end on the side of the cutting blade and a second end opposite to the first end. The palm contact part is inclined relative to a reference line as viewed in a plan view such that the first end is positioned on a rear side of the second end as viewed from the side of the operator. The reference line extends perpendicular to a surface of the cutting blade.

With this arrangement, for example, the operator may be positioned on the front side of the cutting device and on the left side of the cutting blade and may extend his or her right hand toward the right side of the cutting blade for grasping the grip portion. Because the palm contact part of the grip portion is inclined relative to the reference line as viewed in a plan view such that the first end is positioned on a rear side of the second end as viewed from the side of the operator, the palm contact part is substantially perpendicular to the extending direction of the right hand of the operator as the operator extends his or her right hand rightwardly and obliquely rearwardly to the right side of the cutting blade for grasping the grip portion. Therefore, the operator can grasp the grip portion in a comfortable position without need of largely twisting the wrist of his or her right hand. Therefore, the operability of the cutting device can be improved.

The grip portion may have a rod-like configuration, so that the operator can easily grasp the grip portion. In addition, the rod may have a linear configuration, a configuration curved like an arc or a configuration having a diameter gradually varying along the length of the rod.

In the case of the grip portion positioned on the right side of the cutting blade, the left end of the palm contact part may be positioned rearwardly (away from the operator) of the right end by a small distance, so that the operator can grasp the grip portion in a comfortable position without need of largely twisting his or her right hand wrist.

On the other hand, in the case of the grip portion positioned on the left side of the cutting blade, the right end (on the side of the operator) of the palm contact part may be positioned rearwardly (away from the operator) of the left end by a small distance, so that the operator can grasp the grip portion in a comfortable position without need of largely twisting his or her right hand wrist. In this case, the operator may be positioned on the right side of the cutting blade and may extend his or her left hand toward the right side of the cutting blade for grasping the grip portion.

In brief, the construction of inclining the palm contact part of the grip portion relative to the reference line as viewed in a plan view such that the first end is positioned on a rear side of the second end (as viewed from the side of the operator) may be understood to be a construction of orienting the grip portion to face toward the operator.

The palm contact part may also be inclined in the same direction throughout its length between the first end and the second end.

The cutting unit may further include a switch lever disposed on a side opposite to the palm contact part of the grip portion, so that the operator can operate the switch lever while the operator grasps the grip portion. The switch lever has a finger contact part that can be touched by fingers of the operator when the operator pulls the switch lever. As the operator operates the switch lever, the switch lever can move from a first position to a second position where the finger contact part extends substantially parallel to the palm contact part of the grip portion. For example, the switch lever is coupled to a motor for rotatably driving the cutting blade, so that the motor is started when the switch lever is moved from the first position to the second position.

With this arrangement, in addition to the previously described advantages that the operator can grasp the grip portion without need of largely twisting his or her wrist, it is not necessary for the operator to largely twist his or her wrist for pulling the switch lever by his or her fingertips. Therefore, the operability of the cutting device can be further improved. In particular, because the finger contact part is brought to be positioned parallel to the palm contact part as the switch lever is pulled by the operator, it is possible to comfortably maintain the pulled position of the switch lever without need of twisting the wrist or fingers of the operator even in the case that the operator holds the switch lever at the pulled position for an extended period of time.

The palm contact part may be inclined relative to the reference line by an angle of between about 5° and about 10°.

An embodiment of the present invention will now be described with reference to FIGS. 1 to 8. Referring to FIG. 1, an entire cutting device 1 according to the embodiment is shown. In this embodiment, the cutting device 1 is configured as a table circular saw. The cutting device 1 generally includes a table 2 for placing thereon a workpiece (not shown), a base 3 supporting the table 2 such that the table 2 can rotate relative to the base 3 within a horizontal plane, and a cutting unit 10 disposed on the upper side of the table 2 and vertically pivotally supported on the table 2. In order to operate the cutting device 1, an operator may be positioned on a front side of the sheet showing FIG. 1 (and also on a front side of the sheet showing FIG. 2). In this specification, the terms "front side", "rear side", "right side" and "left side" are used to mean the sides as viewed from the side of the operator who is positioned for operating the cutting device 1.

The base 3 has auxiliary tables 3a positioned on the right and left sides of the table 2. A positioning fence 4 for positioning the workpiece is mounted to the auxiliary tables 3a and extends therebetween. The positioning fence 4 has right and left positioning surfaces 4a that are perpendicular to an upper surface of the table 2 and extend through a center of rotation of the table 2 as viewed from the upper side (i.e., in a plan view). The workpiece can be positioned within a plane parallel to the upper surface of the table 2 by setting the workpiece to contact with the right and left positioning surfaces 4a.

The cutting unit 10 is vertically pivotally supported on the table 2 via a support 5 that is mounted to the rear portion of the table 2. The cutting unit 10 has a circular cutting blade 11. A blade case 12 covers a substantially upper half of the cutting blade 11. A movable cover 13 covers a substantially lower half of the cutting blade 11. As the cutting unit 10 pivots downward, the movable cover 13 moves to uncover the lower half of the cutting blade 11, so that the exposed lower half can cut the workpiece.

An electric motor 14 is mounted to the backside (right side as viewed from the side of the operator) of the blade case 12 in order to rotatably drive the cutting blade 11. In this embodiment, a longitudinal axis of the electric motor 14 extends obliquely upward from the blade case 12, so that an output shaft (not shown) of the electric motor 14 is inclined obliquely relative to the vertical direction. A handle 20 is positioned proximal to a mount base of the motor 14 and is mounted to the right side of the blade case 12. The operator can grasp the handle 20 for vertically pivoting the cutting unit 10.

Figure 4:
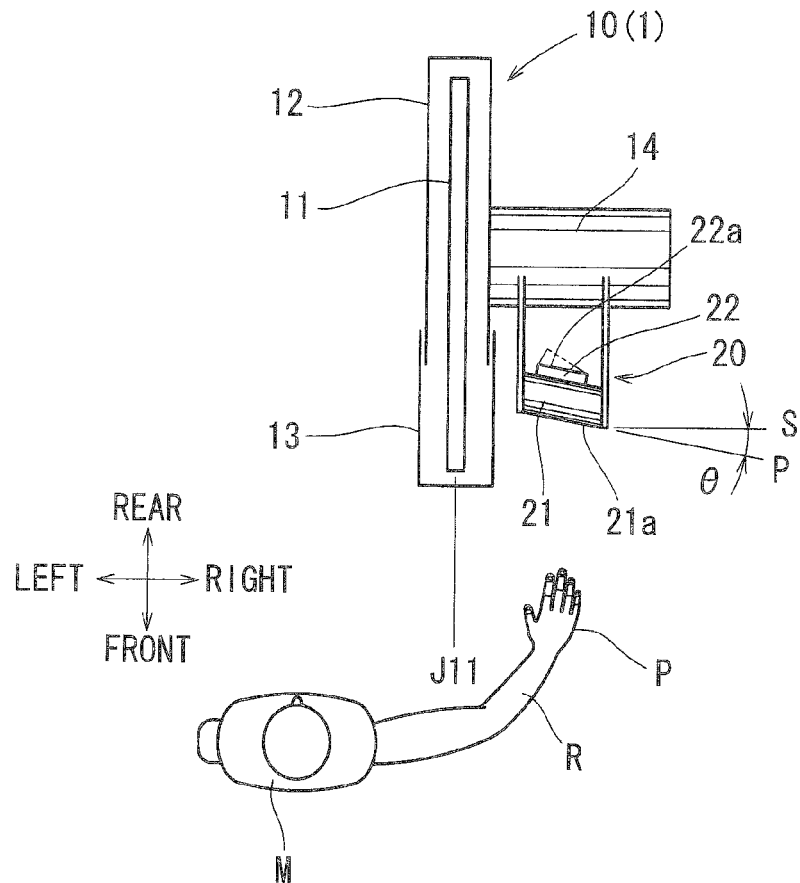
FIG. 4 is a schematic plan view of a cutting unit of the cutting device and showing the positional relationship between the cutting unit and an operator who operates the cutting device.

The handle 20 is positioned on the right side of the cutting blade 11. In other words, the handle 20 is positioned on the right side of a rotational plane 311 of the cutting blade 11. In general, as shown in FIG. 4, in order to operate the cutting device 1, an operator M is positioned on the front side of the cutting unit 10 and on the left side of the cutting blade 11 by a small distance. With this position, in order to grasp the handle 20, the operator M extends his or her right hand R to the handle 20 in a direction toward the right side of the cutting blade 11. The handle 20 has a grip portion 21 that can be grasped by the right hand R of the operator M. The grip portion 21 is configured as a horizontal-type grip portion and extends horizontally (in right and left directions).

The grip portion 21 includes a palm contact part 21a, to which the palm of the right hand R of the operator M touches when the grip portion 21 is grasped by the right hand R. The palm contact part 21a defines a front side of the grip portion 21 on the side of the operator M. The palm contact part 21a is inclined relative to a reference line S by a small angle θ. The reference line S is perpendicular to the rotational plane 311 of the cutting blade 11. In this embodiment, the angle θ is set to be about 7°. In addition, the palm, contact part 21a is inclined such that its left end side is positioned rearwardly of its right end side as viewed in plan view. In FIG. 4, a line P designates a line extending along the palm contact part 21a, and therefore, the line P is inclined relative to the reference line S by the angle θ in a clockwise direction as viewed in a plan view. In this embodiment, the line P is substantially parallel to the longitudinal direction of the grip portion 21. In this embodiment, the line P is also called a grasping axis line P.

Figure 5:
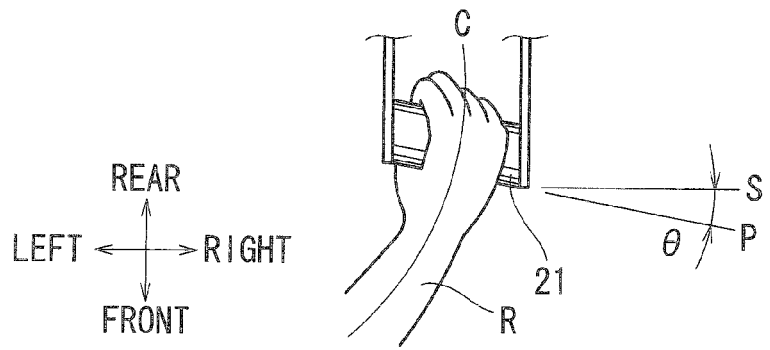
FIG. 5 is a plan view of a grip portion of the cutting unit and shown the state where the grip portion has been grasped by a right hand of the operator without need of largely twisting the wrist of the right hand.
Figure 6:
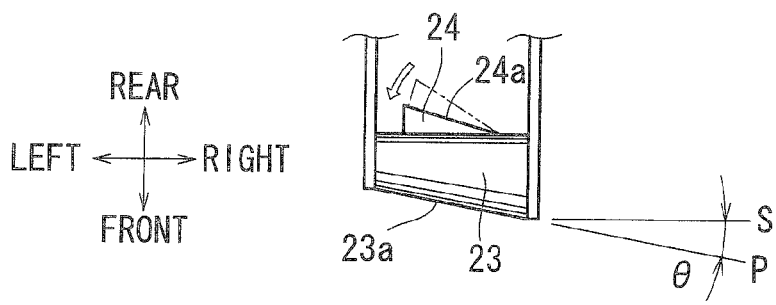
FIG. 6. is a plan view of a grip portion of an alternative embodiment.
Figure 7:
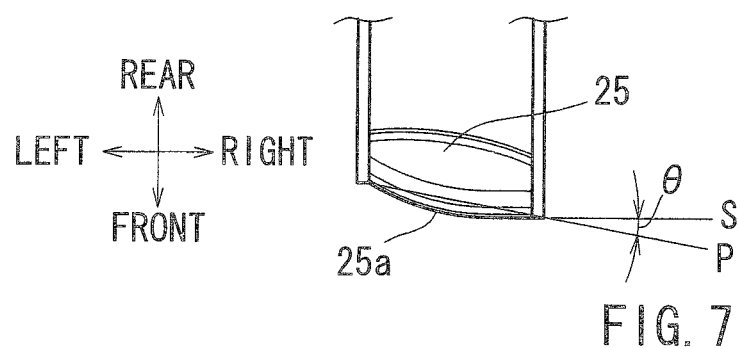
FIG. 7 is a plan view of a grip portion of another alternative embodiment.

Therefore, when the operator M positioned on the right side of the cutting blade 11 extends his or her right hand R obliquely rightwardly and rearwardly toward the grip portion 21 to grasp the same, the operator M can grasp the grip portion 21 in a comfortable position without need of largely twisting his or her right hand wrist as indicated by a wrist twisting line C in FIG. 5.

Figure 8:
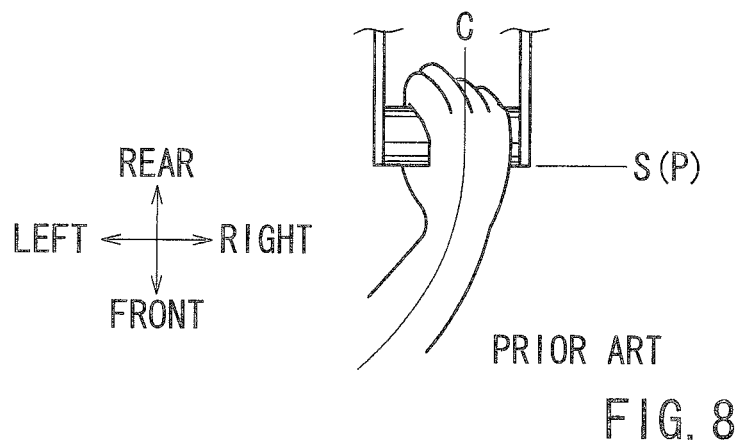
FIG. 8 is a plan view of a grip portion of a known cutting device and showing the state where the grip portion has been grasped by a right hand of an operator.

In contrast, in the case of a known horizontal-type grip portion having a palm contact part that extends perpendicular to the surface of the rotational plane of the cutting blade (i.e., parallel to the reference line S) as shown in FIG. 8, when the operator grasps the grip portion with his or her hand while he or she is positioned at the same position described above, it is necessary to twist his or her hand by a large angle than in the case of FIG. 5. Therefore, the operator is forced to take a cramped position because the grasping axis line P coincides with the reference line S as shown in FIG. 8. The wrist twisting line C shown in FIG. 5 is curved gently than the wrist twisting line C shown in FIG. 8. Therefore, by incorporating the grip portion 21 of the embodiment, the operator does not need to twist the wrist by a large angle in comparison with the case where the known horizontal grip portion is used.

Returning to FIG. 4, a switch lever 22 is mounted to the grip portion 21 on the side opposite to the palm contact part 21a. The operator M can operate to pull the switch lever 22 by fingertips of his or her right hand R while the operator M grasps the grip portion 21. When the operator M pulls the switch lever 22, the motor 14 is started to rotatably drive the cutting blade 11. As the switch lever 22 is pulled by the operator M, the switch lever 22 moves to a position where a finger contact part 22a, to which the fingertips of the operator M touch during the pulling operation, is positioned to be substantially parallel to the palm contact part 21a. Therefore, the operator M can easily hold the switch lever 22 at an ON position for starting the motor M without need of twisting fingertips of his or her hand R relative to the palm when the operator pulls the switch lever 22 with his or her fingertips while the operator M grasps the grip portion 21 by extending his or her right hand R. In order to perform a cutting operation by the cutting device 1, the operator M grasps the grip portion 21, pivots the cutting unit 10 downward and pulls the switch lever 22 for rotating the cutting blade 11. According to the embodiment, during the cutting operation, the operator M can hold for a long time with reduced fatigue the state where cutting unit 10 is held at a downward pivoted position by grasping the grip portion 21 and the switch lever 22 is held at to the ON position by his or her fingertips. Therefore, the operability of the cutting device 1 is improved in this respect.

As described above, according to the embodiment of the present invention, when the operator M is positioned on the front side of the table cutting device 1 and on the left side of the cutting blade 11, the operator M can grasp the grip portion 21 of the handle 20 by extending his or her right hand R to the grip portion 21 of the handle 20 in a direction toward the right side and can vertically pivot the cutting unit 10. The grip portion 21 is of a horizontal type and extends in right and left directions. In addition, the grasping axis line P is inclined relative to the reference line S in the clockwise direction (i.e., the direction orienting toward the operator) as viewed in plan view. Therefore, the operator M can grasp the grip portion 21 in a comfortable position without need of largely twisting his or her wrist. Therefore, the operability of the handle 20 can be improved.

In addition, as the fingertips of the operator M pull the switch lever 22 positioned on the inner side of the grip portion 21, the fingertip contact part 22a is moved to a position where the fingertip contact part 22a extends substantially parallel to the palm contact part 21a of the grip portion 21. Therefore, the operator can hold the pulled state of the switch lever 22 in a comfortable position without need of twisting his or her fingertips relative to the palm.

The present invention may not be limited to the above embodiment but may be modified in various ways. For example, in the above embodiment, the grip portion 21 is inclined in the clockwise direction (i.e., the direction for facing toward the operator) relative to the reference line S as viewed in plan view by inclining both of the palm contact part 21a and a part opposite thereto, to which the switch lever 22 is mounted. However, according to an alternative embodiment shown in FIG. 6, a part of a grip portion 23 on the side opposite to a palm contact part 23a may extend substantially parallel to the reference line S, while the palm contact part 23a of the grip portion 23 is inclined relative to the reference line S by an angle θ, so that the grasping axial line P is inclined in the same direction.

In addition, although the above described palm contact part 21a (23a) is configured as a substantially flat surface, according to an alternative embodiment shown in FIG. 8, a grip portion 25 has a palm contact part 25a and a part opposite thereto each defining a convex surface curved outwardly like a circular arc, so that the grip portion 25 has a configuration having a cross section increasing toward the central portion from opposite ends in the longitudinal direction. Also with this arrangement, a line connecting between opposite ends of each of the palm contact part 25a and the part opposite thereto and substantially parallel to the grasping axial line P is inclined such that the left side end is positioned on the rear side of the right side end, so that the grasping axial line P is inclined by an angle θ relative to the reference line S. Also with this arrangement, it is possible to achieve the same advantages as the above embodiments. Although illustration is omitted, in a further alternative embodiment, each of the palm contact part 25a and the part opposite thereto of the grip portion 25 may be curved inwardly like a circular arc to define a concave surface.

Further, although the angle θ of inclination of the grasping axial line P is set to be about 7° in the above embodiment, such an inclination angle may be set, for example, within a range of between about 5° and about 10° depending various factors, such as a position of the handle relative to the cutting blade 11. Thus, the inclination angle may be suitably determined such that the operator M can grasp the grip portion in a comfortable position without need of largely twisting his or her wrist. In brief, at least the palm contact part of the grip portion of the handle is oriented or inclined toward the side of the cutting blade 11, so that the operator can grasp the grip portion without need of largely twisting his or her wrist Furthermore, although the present invention has been described in connection with the cutting device 1 having the handle 20 positioned on the right side (as viewed from the side of the operator M) relative to the cutting blade 11, the present invention can be applied to a cutting device having a handle positioned on the left side relative to a cutting blade. Thus, also in such a cutting device, a grip portion of the handle may be inclined by a suitable angle toward the side of the cutting blade, so that the operator can grasp the grip portion without need of largely twisting his or her wrist.

This invention claims:

1. A cutting device comprising:
a table configured to accommodate a workpiece; and
a cutting unit positioned on an upper side of the table and being operable to vertically pivot relative to the table; wherein:
the cutting unit includes a cutting blade rotatable about a rotational axis and a grip portion disposed horizontally on a lateral side of the cutting blade and capable of being grasped by an operator in order to vertically pivot the cutting unit, so that a distance between the cutting blade and the table changes as the cutting unit vertically pivots;
the grip portion has a palm contact part that can be touched by a palm of the operator when the grip portion is grasped by the operator;
the palm contact part has a first end on the side of the cutting blade and a second end opposite to the first end, so that the first end and the second end are displaced from each other in a direction of the rotational axis of the cutting blade;
the palm contact part is inclined relative to a reference line as viewed in a plan view such that the first end is positioned on a rear side of the second end as viewed from the side of the operator;
the reference line extends perpendicular to a surface of the cutting blade; and
the palm contact part is inclined in a same direction throughout its length between the first end and the second end such that any portion of the palm contact part along a length between the first end and the second end is inclined in the same direction.

2. The cutting device as defined in claim 1, wherein:
the cutting unit further includes a switch lever disposed on a side opposite to the palm contact part of the grip portion, so that the operator can operate the switch lever while the operator grasps the grip portion,
the switch lever has a finger contact part that can be touched by imagers of the operator when the operator pulls the switch lever; and
as the operator operates the switch lever, the switch lever can move from a first position to a second position where the finger contact part extends substantially parallel to the palm contact part of the grip portion.

3. The cutting device as in claim 2, wherein:
the cutting unit further includes a motor for rotatably driving the cutting blade; and
the switch lever is coupled to the motor, so that the motor is started when the switch lever is moved from the first position to the second position.

4. The cutting device as in claim 1, wherein the palm contact part is inclined relative to the reference line by an angle of between about 5° and about 10°.

5. The cutting device as in claim 2, wherein the palm contact part is inclined relative to the reference line by an angle of between about 5° and about 10°.

6. A cutting device comprising:
a table configured to accommodate a workpiece; and
a cutting unit positioned on an upper side of the table and vertically pivotable relative to the table; wherein:
the cutting unit includes a cutting blade rotatable about a rotational axis and a horizontal grip portion capable of being grasped by an operator who is positioned for vertically pivoting the cutting unit, so that a distance between the cutting blade and the table changes as the cutting unit vertically pivots;
the grip portion has a first surface and a second surface opposite to the first surface, the first surface being capable of touching to a palm of the operator when the operator grasps the grip portion;
the first surface is inclined relative to the rotational axis of the cutting blade, so that the first surface faces the operator;
the grip portion has a first end on a side of the cutting blade and a second end opposite to the first end, so that the first end and the second end are displaced from each other in a direction of the rotational axis of the cutting blade; and
the first surface is inclined in a same direction throughout its length between the first end and the second end of the grip portion such that any portion of the first surface along a length between the first end and the second end of the grip portion is inclined in the same direction.

7. The cutting device as in claim 6, wherein the first surface is configured as a substantially flat surface.

8. The cutting device as in claim 6, wherein the second surface is substantially parallel to the first surface.

9. The cutting device as in claim 6, wherein:
the cutting unit further includes a switch lever mounted to the grip portion on a side of the second surface, so that the operator can operate the switch lever while the operator grasps the grip portion;
the switch lever has a finger contact part that can be touched by fingers of the operator when the operator pulls the switch lever; and
as the operator operates the switch lever, the switch lever can move from a first position to a second position where the finger contact part extends substantially parallel to the first surface of the grip portion.

10. The cutting device as in claim 9, wherein:
the cutting unit further includes a motor for rotatably driving the cutting blade; and
the switch lever is coupled to the motor, so that the motor is started when the switch lever is moved from the first position to the second position.

11. A cutting device comprising:
a table configured to accommodate a workpiece; and
a cutting unit positioned on an upper side of the table and being able to vertically pivot relative to the table; wherein:
the cutting unit includes a cutting blade rotatable about a rotational axis and a grip portion disposed horizontally on a lateral side of the cutting blade, so that a distance between the cutting blade and the table changes as the cutting unit vertically pivots;
the grip portion has a palm contact part, the palm contact part has a first end on the side of the cutting blade and a second end opposite to the first end, so that the first end and the second end are displaced from each other in a direction of the rotational axis of the cutting blade;
the palm contact part is inclined relative to a reference line as viewed in a plan view such that the first end is positioned on a rear side of the second end as viewed from the side of the operator;
the reference line extends perpendicular to a surface of the cutting blade; and
the palm contact part is inclined in a same direction throughout its length between the first end and the second end such that any portion of the palm contact part along a length between the first end and the second end is inclined in the same direction.

12. The cutting device as defined in claim 11, wherein:

the cutting unit further includes a switch lever disposed on a side opposite to the palm contact part of the grip portion, the switch lever has a finger contact part, and during operation, the switch lever can move from a first position to a second position where the finger contact part extends substantially parallel to the palm contact part of the grip portion.

13. The cutting device as in claim 12, wherein:

the cutting unit further includes a motor for rotatably driving the cutting blade; and the switch lever is coupled to the motor, so that the motor is started when the switch lever is moved from the first position to the second position.

14. The cutting device as in claim 11, wherein the palm contact part is inclined relative to the reference line by an angle of between about 5° and about 10°.

15. The cutting device as defined in claim 1, wherein the cutting blade is a circular cutting blade, and the palm contact part is inclined relative to a surface of the circular cutting blade.

16. The cutting device as defined in claim 1, wherein the cutting unit includes a motor, and the grip portion is connected to the motor by a pair of arms that extend parallel to each other.

17. The cutting device as defined in claim 1, wherein when the cutting unit is positioned at a lowermost position, the motor extends obliquely upward while the grip portion is positioned substantially within a horizontal plane.

18. The cutting device as defined in claim 1, wherein the grip portion is non-rotatable relative to the cutting unit and when the cutting unit is position at a lowermost position the grip portion is positioned substantially within the horizontal plane.

* * * * *